Oct. 22, 1935.  J. SHOVLOWSKY  2,018,503
ADJUSTABLE GARMENT EDGE CUTTER AND GRADER
Filed Feb. 14, 1935   2 Sheets-Sheet 1
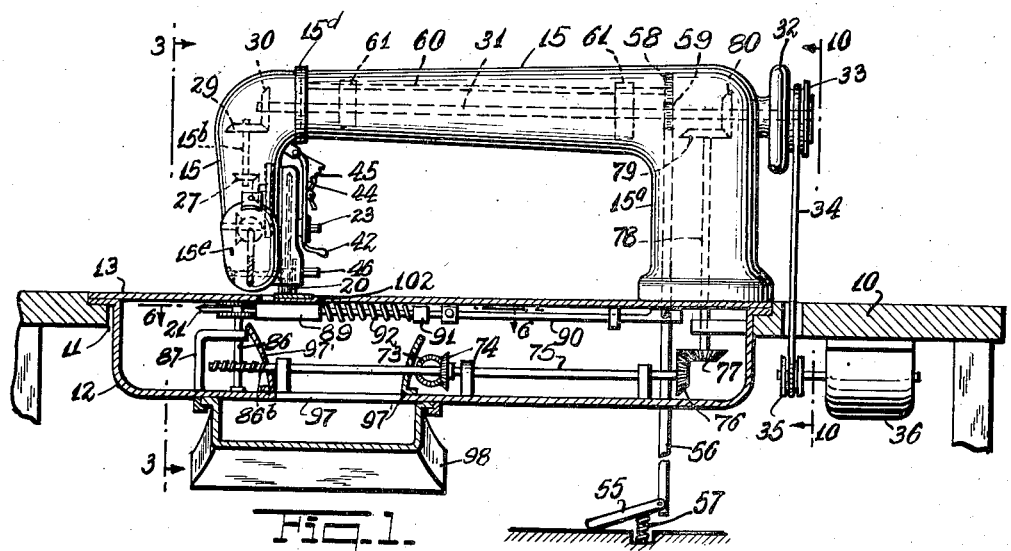
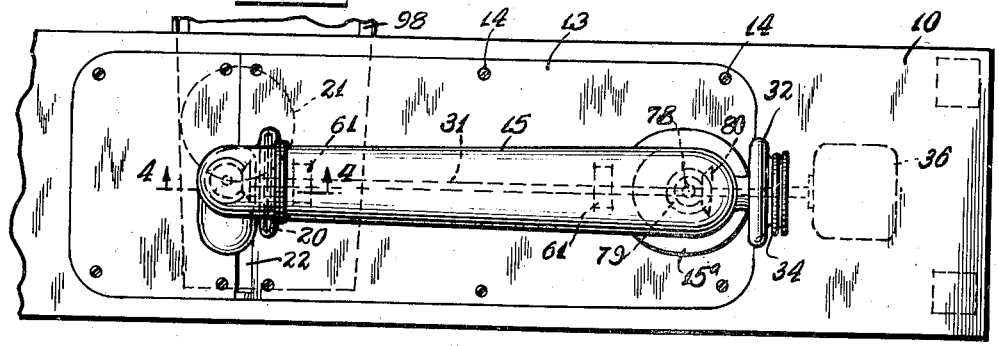
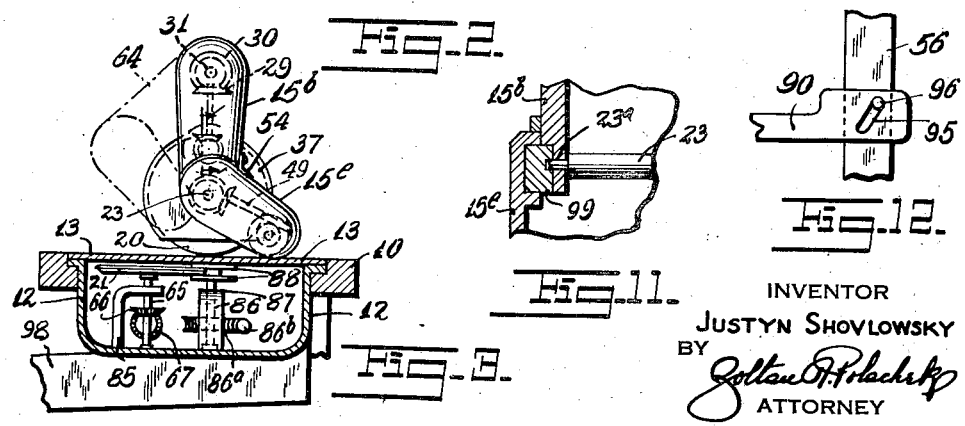
INVENTOR
JUSTYN SHOVLOWSKY
BY
ATTORNEY Oct. 22, 1935. J. SHOVLOWSKY 2,018,503
ADJUSTABLE GARMENT EDGE CUTTER AND GRADER
Filed Feb. 14, 1935 2 Sheets-Sheet 2
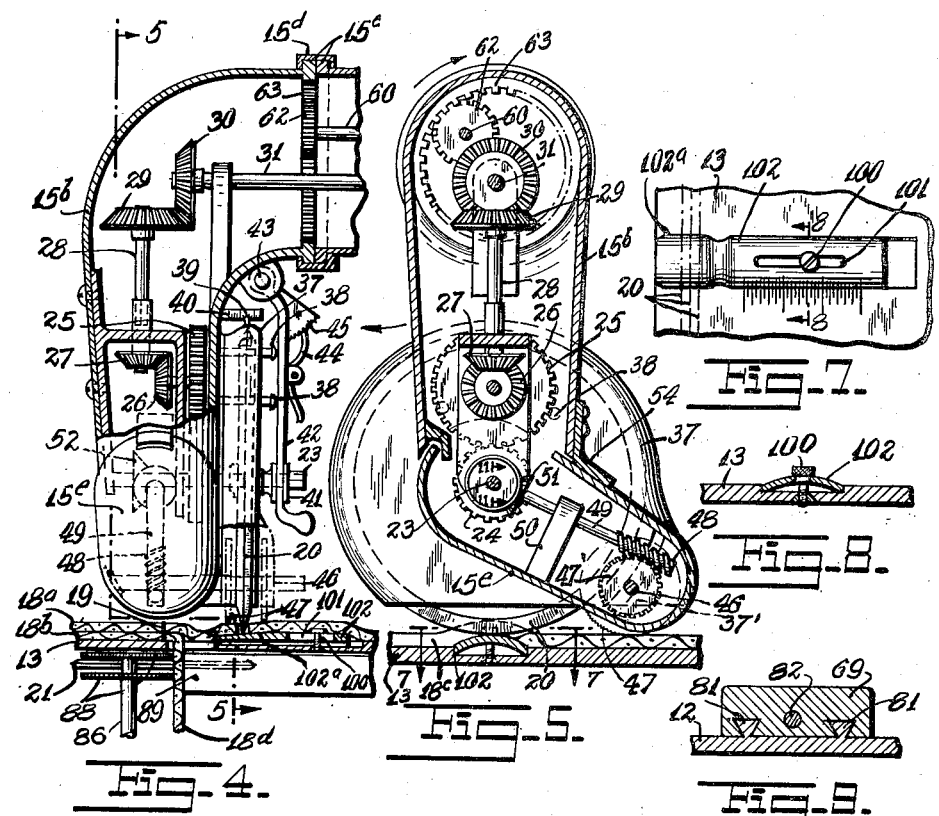
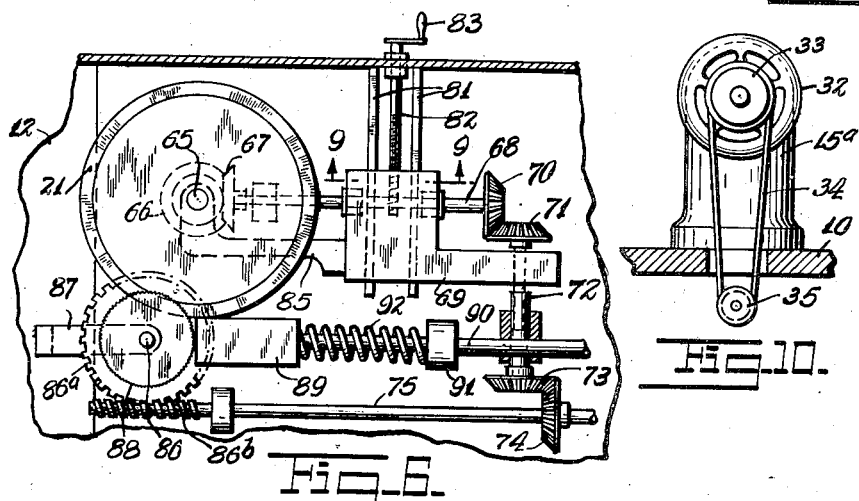
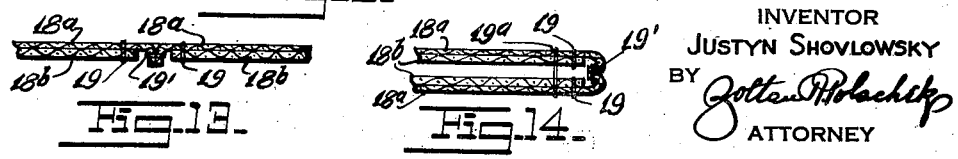
INVENTOR
JUSTYN SHOVLOWSKY
BY
ATTORNEY Patented Oct. 22, 1935

2,018,503

UNITED STATES PATENT OFFICE 2,018,503

ADJUSTABLE GARMENT EDGE CUTTER AND GRADER

Justyn Shovlowsky, Brooklyn, N. Y.

Application February 14, 1935, Serial No. 6,528

17 Claims. (Cl. 164—60)

This invention relates to new and useful improvements in an adjustable edge cutter and grader.

It is an object of this invention to construct a device as mentioned which is adapted to cut the edges of superimposed layers of materials which are stitched together near the edges, in such a fashion that the material between the stitches are edges of different widths. The purpose of the invention may be understood by a brief explanation that with such a construction it is possible to fabricate clothes in which the seams are comparatively thin when compared with seams of old constructions. Should the superimposed layers have their edges coinciding, and the parts secured together by the conventional stitching and bending of these edges, the seams must be thick. But if the edges of the different layers are cut so that the outer layers may be stitched and bent while the inner layers remain flat, the seams will be comparatively thin.

The invention particularly contemplates the provision of a means for bending at angles to each other the edges of the superimposed layers of stitched together material to facilitate cutting of the edges from the stitches to different widths. Once the edges are bent apart from each other it is possible to have one cutter cut one edge, and a second cutter cut the second edge.

The invention also contemplates an arrangement of the bent edges as mentioned in the previous paragraph in which the edges are at right angles to each other so that a vertical and a horizontal cutter may be used to cut the respective edges.

The invention also proposed numerous mechanical features in the structure of the device that have valuable advantages.

Still further the invention proposes the construction of a device as mentioned which is simple and durable and which can be manufactured and sold at a reasonable cost.

For further comprehension of the invention, and of the objects and advantages thereof, reference will be had to the following description and accompanying drawings, and to the appended claims in which the various novel features are more particularly set forth.

In the accompanying drawings forming a material part of this disclosure:

Fig. 1 is a side elevational view of a device constructed according to this invention, the lower portion thereof being broken away and shown in section.

Fig. 2 is a plan view of Fig. 1.

Fig. 3 is a sectional view taken on the line 3—3 of Fig. 1.

Fig. 4 is a fragmentary enlarged sectional view taken on the line 4—4 of Fig. 2.

Fig. 5 is a fragmentary sectional view taken on the line 5—5 of Fig. 4.

Fig. 6 is a fragmentary horizontal sectional view taken on the line 6—6 of Fig. 1.

Fig. 7 is a fragmentary elevational view looking in the direction of the line 7—7 of Fig. 5.

Fig. 8 is a sectional view taken on the line 8—8 of Fig. 7.

Fig. 9 is a sectional view taken on the line 9—9 of Fig. 6.

Fig. 10 is a sectional view taken on the line 10—10 of Fig. 1.

Fig. 11 is a fragmentary sectional view taken on the line 11—11 of Fig. 5.

Fig. 12 is a fragmentary enlarged detailed view of a portion of Fig. 1.

Fig. 13 is a vertical sectional view of the seam cut by the device according to this invention.

Fig. 14 is a similar view to Fig. 13, illustrating the folded and finished seam.

The device, according to this invention, includes a table 10 having a top opening 11 with a recess around the sides thereof upon which there is mounted a tray 12 and a cover plate 13. The tray 12 has peripheral flanges with their edges resting in the recess, and the cover plate engages over the tray and is also disposed in the recess. Screws 14 serve to secure the cover plate and tray in a fixed position.

A machine body 15 is mounted upon the cover plate and is substantially of inverted U-shape having side arms 15$^a$ and 15$^b$. The side arm 15$^a$ is integral with the horizontal portion of the body, while the side arm 15$^b$ is swivelled on the horizontal portion of the body. The swivel connection is accomplished by the adjacent ends of the parts being formed with flanges 15$^c$ held rotatively together by an annular shaped member 15$^d$. The extreme end of the side arm 15$^b$ is formed with a movable finger tip 15ᵉ. The machine is very similar in appearance and operation to a sewing machine. The material to be operated on is engaged in feeders under the side arm 15ᵇ and then as the machine operates, the material is moved forward and cut as desired.

In Fig. 4 the superimposed layers 18ᵃ and 18ᵇ are shown secured together with a line of stitches 19 so as to have free edge pieces 18ᶜ and 18ᵈ. These edge pieces are engaged into the machine so as to be at right angles to each other. The edge piece 18ᶜ is cut by a disc-shaped cutter 20, and the edge piece 18ᵈ is cut by a disc-shaped cutter 21. The cover plate 13 is formed with an opening 22 into which the edge 18ᵈ is engaged into a feeding device as hereinafter further described. The cover plate 13 and opening 22 act as a forming element for bending the edges of the layers during the feeding thereof.

The cutter 20 is mounted upon a shaft 23 rotatively supported in the side arm 15ᵇ and connected with driving means. More particularly, there is a gear 24 fixed on the shaft 23 and meshing with a gear 25 fixed upon a shaft provided with a bevel gear 26. The bevel gear 26 meshes with a gear 27 upon a shaft 28 provided with a bevel gear 29 meshing with another bevel gear 30 on a shaft 31 extending through the horizontal portion of the body 15. The extended end of the shaft 31 is provided with a hand wheel 32 and a pulley 33. A belt 34 connects the pulley 33 with a pulley 35 upon a motor 36 mounted upon the table 10.

The cutter 20 is adapted to be adjusted transversely. It is rotatively supported in a casing 37 so as to move bodily therewith, and the casing mounted on the side arm 15ᵇ by the provision of a plurality of studs 38. These studs are fixed and project from the side arm 15ᵇ and merely slidably support the casing 37. A pointer 39 upon the casing 37 cooperates with a scale 40 fixed upon the side arm 15ᵇ so that the position of the cutter 20 may be known. A bushing 41 is fixed upon the side of the casing 37 coaxial with the shaft 23 and is engaged by a forked portion of a lever 42. The upper end of this lever is hingedly mounted on a lug 43. The lower end is provided with a handle by which the lever may be conveniently moved.

A mechanism is provided for holding the lever 42 in various adjusted positions. This mechanism consists of a pivotally mounted latch member 44 engageable with the teeth 45 of a segmental member fixed upon the side arm 15ᵇ. The extended end of the shaft 23 is formed with a squared section which is square in transverse cross section; so that the blade 20 is slidable longitudinally upon the shaft 23 but is rotated by the shaft as the latter element rotates.

A feeding device is associated with the cutter 20 for feeding the cloth layer forwards. This feeding device consists of a shaft 46 mounted through the finger 15ᵉ and adapted to drive a pair of discs 47 having serrated peripheries. These peripheries are engageable with the cloth layer 18ᶜ. The discs 47 are rotatively supported upon the casing 37, and are formed with square central openings engaging in a squared section of the shaft 46 so that rotations are transmitted, while the discs may be moved along bodily with adjustments of the casing 37. The shaft 46 is equipped with a worm wheel 47' meshing with a worm 48 upon a shaft 49 rotative in a standard 50 upon the finger 15ᵉ. The shaft 49 has a bevel gear 51 meshing with a bevel gear 52 upon the shaft 23.

The arrangement is such that the finger portion 15ᵉ may pivot around the shaft 23 as an axis, and the gears 51 and 52 maintain their mesh positions. The body 37 is formed with a slot 37' so that the shaft 46 is free from the body and may be moved away therefrom. A spring 54 is mounted upon the side arm 15ᵇ and acts upon the finger tip 15ᵉ for normally urging the finger tip downwards so that the serrated discs 47 engage the cloth material 18ᶜ.

A means is provided for moving the cutter 20 to an inoperative position. This means consists of a foot treadle 55 connected with a link 56 urged upwards by an expansion spring 57 beneath the foot lever. The link 56 is formed with rack teeth 58 at its top which mesh with a pinion 59 upon a shaft 60 extending through the horizontal portion of the body 15. This shaft is rotative in standards 61 in the body 15. A gear 62 is mounted on the shaft 60 and meshes with an internal gear 63 formed upon the flange of the side arm 15ᵇ. The arrangement is such that when the foot pedal 55 is depressed the side arm 15ᵇ will be turned clockwise, when the device is viewed from the left-hand end in Figs. 1 and 2, and the side arm 15ᵇ will be moved to an inoperative position, indicated by the dot and dash lines 64 in Fig. 3. The finger tip 15ᵉ is adapted to turn about the shaft 23 as an axis, as permitted by the resiliency of the spring 54 to allow the side arm 15 to be moved to the inoperative position. Similarly, the finger 15ᵉ will turn to allow the side arm 15ᵇ to be moved back to the operative position.

The bottom cutter 21 is fixed on a vertical shaft 65 rotatively mounted. A bevel gear 66 upon the shaft 65 meshes with a bevel gear 67 upon a shaft 68 rotative in a block 69 which is adjustably mounted. A bevel gear 70 upon the shaft 68 meshes with a bevel gear 71 rotatively upon the block 69 and fixed upon a shaft 72 consisting of telescopic sections. The arrangement is that rotations will be transmitted by the shaft 72, while at the same time the sections may be adjusted longitudinally, which permits the block 69 to be moved. A gear 73 is fixed upon the shaft 72 and meshes with a gear 74 upon a drive shaft 75.

This drive shaft is supported upon a tray 12 and is equipped with a bevel gear 76 meshing with a bevel gear 77 upon a shaft 78 extending through the side arm 15ᵃ of the body 15. A gear 79 upon the shaft 78 meshes with a gear 80 upon the shaft 31. The arrangement is such that simultaneously with the driving of the shaft 31 which results in the driving of the top cutter 20, the bottom cutter 21 will also operate.

The block 69 is slidable upon tracks 81 mounted upon the tray. An adjustment screw 82, also mounted on the tray, is equipped with a handle 83 by which it may be operated. This adjustment screw threadedly engaged into the block so that the block may be adjusted. The shaft 65 is not directly mounted upon the tray 12 but is supported in standards 85 mounted upon the block 69. The arrangement is such that when the handle 83 is turned, the cutting blade 21 or a substitute blade of slightly different size may be moved forwards and backwards and placed in efficient cutting relation with respect to the discs 88 and head 89, and in all positions maintain its driving connection.

A means is provided for feeding the edge 18ᵈ of the cloth. This means consists of a vertical shaft 86 supported in a standard 87 mounted upon a tray 12. A pair of discs 88 with serrated peripheries are mounted upon the shaft 86 and are engaged by the head 89 of a spring pressed plunger. This plunger consists of a rod 90 slidably supported in a standard 91. A worm wheel 86ª on the shaft 86 meshes with a worm 86ᵇ on the drive shaft 75. An expansion spring 92 acts between the standard 91 and the plunger head 89 for urging said head against the sides of the discs 88. An arrangement is provided for releasing the operative effect of the plunger head 89 when the pedal 55 is depressed. This arrangement consists in a slot 95 formed at an angle of substantially 45° and upon the end of the rod 90. A pin 96 is mounted in the link 56 and works in the slot 95 in such a fashion that when the pedal 55 is depressed, which moves the link 56 downwards, the rod 90 will be drawn so that the spring 92 is compressed and the head 89 is moved out of contact with the periphery of the discs 88.

The tray 12 is formed with a bottom opening 97 through which the edge pieces which are cut from the layer 18ᵈ may pass through into a removable tray 98 mounted upon the bottom of the tray 12. A pair of baffle plates 97' guide the edge pieces into the tray 98. Fig. 11 shows a detail of the manner in which the finger 15ᵉ is swivelled upon the side arm 15ᵇ. More particularly, the shaft 23 has a reduced end 23ª engaging through an opening in the side arm 15ᵇ and into a block 99 mounted within a coaxial recess in the finger 15ᵉ. The arrangement is such that the finger 15ᵉ may move coaxially with the shaft 23.

A soft metal cloth guide 102 is mounted upon the top plate within a recess as shown in Fig. 8 and is adapted to hold the cloth which is being cut against the cutter 20. A screw 100 engages through a slot 101 in the guide 102 and holds it in fixed positions. A scale is inscribed on the guide 102 and the material of the top plate adjacent the guide for indicating the position of the guide. The guide 102 has a head 102ª with an inclined top surface to properly hold the cloth in contact with the cutter 20. In Fig. 7 the dot and dash lines indicate the cutter 20.

The pedal 55 must be depressed to move the side arm 15ᵇ and the plunger head 89 to its inoperative position. Then the layers 18ª and 18ᵇ may be placed upon the table 10 and arranged so that the edge 18ª is extended down through the opening 22 to be in a position to be clamped by the plunger head 89 and the feeder discs 88. The edge 18ᶜ is then placed in a position to be cut by the top cutter 20. If it is desired, the positions of the cutter may now be adjusted so that the pieces cut from the edges may be of a width desired. The pedal 55 is then released which causes the side arm 15ᵇ to move to its operative position, and the plunger head 89 to its operative position. The motor 36 is now energized by the control of a suitable switch preferably a foot controlled switch. Rotations from the motor will be transmitted to the shaft 31 from which the rotations are transmitted to operate the cutters 20 and 21 and the feeders 47 and 49. It is pointed out that the feeders will operate very slow because of the worm and gear reduction units, while the cutters will rotate at great speed.

In Fig. 13 two pairs of cut layers 18ª and 18ᵇ are illustrated with the layers 18ª stitched together by a line of stitches 19'. In Fig. 14 the seam is shown completed; it is made by first folding the layers and then stitching the two fabric materials 18ª and the two lining materials 18ᵇ together by a line of stitches 19ª. The thin seam construction is clearly illustrated. It is made possible by the cutting of the lining material 18ᵇ shorter than the outer fabric material 18ª.

While I have illustrated and described the preferred embodiment of my invention it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A device of the class described, comprising a forming element for bending at angles to each other the edges of super-imposed and stitched together layers of material, means for feeding said layers forward, a cutter for one of said edges, and another cutter for the other of said edges.

2. A device of the class described, comprising a forming element for bending at angles to each other the edges of super-imposed and stitched together layers of material, means for feeding said layers forward, a cutter for one of said edges and another cutter for the other of said edges, said forming element for bending said edges comprising a plate to hold one edge horizontal, and an opening in said plate through which the other edge may be engaged at right angles thereof.

3. A device of the class described, comprising a forming element for bending at angles to each other the edges of superimposed and stitched together layers of material, means for feeding said layers forward, a cutter for one of said edges, and another cutter for the other of said edges, said means for feeding the layers comprising discs with serrated peripheries engaging the edges of said layers.

4. A device of the class described, comprising a table with a top opening closed with a cover plate, a tray mounted beneath said cover plate, a machine body mounted on the cover plate and being of substantially inverted U-shape, one arm of said U-shape being swively mounted, a drive through the upper portion of said machine body, means for feeding the top edge of superimposed and stitched together layers of material, said latter means being operated by said drive, means for feeding a bottom layer of said materials, a bottom cutter, and means for driving said bottom cutter.

5. A device of the class described, comprising a forming element for bending at angles to each other the edges of superimposed and stitched together layers of material, means for feeding said layers forward, a cutter for one of said edges, and another cutter for the other of said edges, and means for adjusting the positions of said cutters to control the widths of the edges cut.

6. In a device of the class described, a table with a top opening, a cover plate closing said opening, a tray supported by its edges upon the edges of said opening, an inverted U-shaped machine body mounted on said cover plate and having one of its arms swivelled, means for bending at angles to each other the edges of superimposed and stitched together layers of sheet material moved beneath said swivelled arm, means for feeding said layers forward, a cutter for cutting one of said edges, and another cutter for cutting the other of said edges.

7. In a device of the class described a table with a top opening, a cover plate closing said opening, a tray supported by its edges upon the edges of said opening, an inverted U-shaped machine body mounted on said cover plate and having one of its arms swivelled, means for bending at angles to each other the edges of superimposed and stitched together layers of sheet material moved beneath said swivelled arm, means for feeding said layers forwards, a cutter for cutting one of said edges, and another cutter for cutting the other of said edges, said feeding means comprising discs with serrated peripheries engaging the layers, and means for slowly turning said discs.

8. In a device of the class described, a table with a top opening, a cover plate closing said opening, a tray supported by its edges upon the edges of said opening, an inverted U-shaped machine body mounted on said cover plate and having one of its arms swivelled, means for bending at angles to each other the edges of superimposed and stitched together layers of sheet material moved beneath said swivelled arm, means for feeding said layers forwards, a cutter for cutting one of said edges, and another cutter for cutting the other of said edges, said feeding means comprising discs with serrated peripheries engaging the layers, and means associated with the driving means of the cutter for slowly turning said discs.

9. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the top edge superimposed and stitched together layers of material, said latter means being operated by said drive, means for feeding a bottom layer of said materials, a bottom cutter, and means for driving said bottom cutter, said top cutter being rotative within a casing, and means for holding the casing in various adjusted positions for controlling the operative positions of the therein cutter.

10. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the top edge of superimposed and stitched together layers of material, said latter means being operated by said drive, means for feeding a bottom layer of said materials, a bottom cutter, and means for driving said bottom cutter, said top cutter being rotative within a casing, and means for holding the casing in various adjusted positions for controlling the operative position of the cutter therein, said latter-mentioned means including a pivoted lever, means for holding the lever in fixed positions, and a forked portion of the lever engaging a bushing of said casing.

11. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the material, said latter means being operated by said drive, means for feeding a bottom layer of said materials, a bottom cutter, and means for driving said bottom cutter, a depressible foot pedal, a transmission from said foot pedal to turn said swivelled arm.

12. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the top edge of superimposed and stitched together layers of material, said latter means being operated by said drive, means for feeding a bottom layer of said materials, a bottom cutter, and means for driving said bottom cutter, a depressible foot pedal, a transmission from said foot pedal to turn said swivelled arm, and including a pinion engaging an internal gear formed upon one end of the swivelled arm.

13. In a device of the class described, a horizontal bottom cutter, an adjustable block upon which said cutter is rotatively mounted, a transmission mounted upon said block for driving the cutter and terminating in a telescopic shaft, a stationary drive means connected with said telescopic shaft, said block being mounted on rails, and a screw threadedly engaging the block for holding the block in various adjusted positions.

14. In a device of the class described, a horizontal bottom cutter rotative upon a block adjustably mounted, a transmission mounted upon said block for driving the cutter and terminating in a telescopic shaft connecting the drive means to a stationary drive means, said block being mounted on rails, and a screw threadedly engaging the block for holding the block in various adjusted positions, a bottom feeder said stationary drive being connected with a worm pinion and worm wheel associated with the bottom feeder for the operation thereof.

15. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the top edge of superimposed and stitched together layers of material, said latter means being operated by said drive, means for feeding a bottom layer of said materials, a bottom cutter, and means for driving said bottom cutter, said bottom feeder including discs with serrated peripheries for engaging the edge of the material, a plunger head operative against the edges of said serrated discs for holding the cloth material, resilient means for urging said plunger into operative position, and a manually controlled means for moving the plunger to an idle position.

16. A device of the class described, comprising a table with a top opening closed with a cover plate, a tray mounted beneath said cover plate, a machine body mounted on the cover plate and being of substantially inverted U-shape, one arm of said U-shape being swivelly mounted, a drive through the upper portion of said machine body, means for feeding the top edge of superimposed and stitched together layers of material, said latter means being operated by said drive, means for feeding a bottom layer of said materials, a bottom cutter, and means for driving said bottom cutter, said bottom feeder including discs with serrated peripheries for engaging the edge of the material, a plunger head operative against the edges of said serrated discs for holding the cloth material, resilient means for urging said plunger into operative position, and a manually controlled means for moving the plunger to an idle position, including a depressible foot pedal connected with a link carrying a pin engaging into an inclined slot in a rod carrying said plunger head.

17. A device of the class described, comprising a forming element for bending at angles to each other the edges of superimposed and stitched together layers of material, means for feeding said layers forward, a cutter for one of said edges, and another cutter for the other of said edges, means for adjusting the positions of said cutters, and indicators for indicating the positions of one of the cutters.

JUSTYN SHOVLOWSKY.